United States Patent
Foster et al.

(10) Patent No.: US 11,475,333 B2
(45) Date of Patent: Oct. 18, 2022

(54) GENERATING SOLUTIONS FROM AURAL INPUTS

(71) Applicant: X Development LLC, Mountain View, CA (US)

(72) Inventors: Nicholas John Foster, Oakland, CA (US); Carsten Schwesig, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/194,498

(22) Filed: Mar. 8, 2021

(65) Prior Publication Data

US 2021/0201180 A1   Jul. 1, 2021

Related U.S. Application Data

(63) Continuation of application No. 15/721,107, filed on Sep. 29, 2017, now Pat. No. 10,963,801.

(51) Int. Cl.
   *G10L 15/22*   (2006.01)
   *G06N 5/04*    (2006.01)
   (Continued)

(52) U.S. Cl.
   CPC .............. *G06N 5/04* (2013.01); *G06F 40/284* (2020.01); *G06F 40/30* (2020.01); *G06N 3/0445* (2013.01);
   (Continued)

(58) Field of Classification Search
   CPC . G10L 15/22; G10L 15/1815; G10L 15/1822; G06N 5/04; G06N 3/0445;
   (Continued)

(56) References Cited

U.S. PATENT DOCUMENTS

| 6,151,571 A  | 11/2000 | Pertrushin |
| 8,121,618 B2 | 2/2012  | Rhoads et al. |
| 8,346,563 B1 | 1/2013  | Hjelm et al. |
| 8,706,503 B2 | 4/2014  | Cheyer et al. |

(Continued)

OTHER PUBLICATIONS www.wikipedia.com [online] "Generative design," last updated Jul. 19, 2017, retrieved on Sep. 17, 2017, retrieved from URL<https://en.wikipedia.org/wiki/Generative_design> 2 pages.

*Primary Examiner* — Michael N Opsasnick
(74) *Attorney, Agent, or Firm* — Fish & Richardson P.C.

(57) ABSTRACT

Techniques for generating solutions from aural inputs include identifying, with one or more machine learning engines, a plurality of aural signals provided by two or more human speakers, at least some of the plurality of aural signals associated with a human-perceived problem; parsing, with the one or more machine learning engines, the plurality of aural signals to generate a plurality of terms, each of the terms associated with the human-perceived problem; deriving, with the one or more machine learning engines, a plurality of solution sentiments and a plurality of solution constraints from the plurality of terms; generating, with the one or more machine learning engines, at least one solution to the human-perceived problem based on the derived solution sentiments and solution constraints; and presenting the at least one solution of the human-perceived problem to the two or more human speakers through at least one of a graphical interface or an auditory interface.

20 Claims, 5 Drawing Sheets

(51) Int. Cl.
*G10L 15/18* (2013.01)
*G06N 20/00* (2019.01)
*G06N 3/04* (2006.01)
*G06N 3/08* (2006.01)
*G06F 40/30* (2020.01)
*G06F 40/284* (2020.01)
*G06N 5/00* (2006.01)

(52) U.S. Cl.
CPC ......... *G06N 3/0454* (2013.01); *G06N 3/0472* (2013.01); *G06N 3/08* (2013.01); *G06N 20/00* (2019.01); *G10L 15/1815* (2013.01); *G10L 15/1822* (2013.01); *G10L 15/22* (2013.01); *G06N 5/003* (2013.01)

(58) Field of Classification Search
CPC ...... G06N 3/0454; G06N 3/0472; G06N 3/08; G06N 20/00; G06N 5/003; G06F 40/284; G06F 40/30
See application file for complete search history.

(56) References Cited

U.S. PATENT DOCUMENTS

| | | | |
|---|---|---|---|
| 10,963,801 B2 * | 3/2021 | Foster | G06N 5/04 |
| 2003/0101151 A1 * | 5/2003 | Holland | G06N 3/004 |
| | | | 706/45 |
| 2008/0114737 A1 | 5/2008 | Neely et al. | |
| 2008/0215557 A1 | 9/2008 | Ramer et al. | |
| 2010/0229112 A1 * | 9/2010 | Ergan | G06F 11/0769 |
| | | | 715/764 |
| 2011/0125501 A1 * | 5/2011 | Holtel | G10L 15/22 |
| | | | 704/E15.001 |
| 2011/0161076 A1 | 6/2011 | David et al. | |
| 2012/0220311 A1 | 8/2012 | Rodriguez et al. | |
| 2014/0101079 A1 * | 4/2014 | Deal | G06N 5/045 |
| | | | 706/12 |
| 2014/0255895 A1 * | 9/2014 | Shaffer | G09B 7/02 |
| | | | 434/350 |
| 2014/0289229 A1 * | 9/2014 | Gangadharaiah | G06Q 10/101 |
| | | | 707/723 |
| 2015/0089399 A1 * | 3/2015 | Megill | H04L 12/1813 |
| | | | 715/753 |
| 2019/0102685 A1 * | 4/2019 | Foster | G10L 15/22 |

* cited by examiner

GENERATING SOLUTIONS FROM AURAL INPUTS

CROSS-REFERENCE TO RELATED APPLICATION

This application is a continuation of U.S. application Ser. No. 15/721,107, filed Sep. 29, 2017, the contents of which are incorporated by reference.

TECHNICAL FIELD

This disclosure generally relates to devices and systems for generating solutions from aural inputs.

BACKGROUND

Human conversations often involve problem solving to an end that includes one or more solutions deemed to be a best-fit by the discussion group. Often, due to, for example, overlapping conversation, memory or comprehension errors, and other human-related deficiencies, the deemed best-fit solution does not capture a true, best-fit solution to the problem.

SUMMARY

This disclosure generally relates to methods, apparatus, and systems for generating solutions from aural inputs. Implementations of the present disclosure can use machine learning techniques to understand and discretize aural inputs, such as multi-human conversation, and transform such inputs into one or more solutions to a problem being presented through the conversation. In some implementations, an audio interface and graphical user interface may be coupled with one or more machine learning engines to receive the aural inputs and output the derived solutions from the machine learning engines, as well as update and change such derived solutions based on additional aural inputs.

In a general implementation, a computer-implemented method executed by one or more processors includes identifying, with one or more machine learning engines, a plurality of aural signals provided by two or more human speakers, at least some of the plurality of aural signals associated with a human-perceived problem; parsing, with the one or more machine learning engines, the plurality of aural signals to generate a plurality of terms, each of the terms associated with the human-perceived problem; deriving, with the one or more machine learning engines, a plurality of solution sentiments and a plurality of solution constraints from the plurality of terms; generating, with the one or more machine learning engines, at least one solution to the human-perceived problem based on the derived solution sentiments and solution constraints; and presenting the at least one solution of the human-perceived problem to the two or more human speakers through at least one of a graphical interface or an auditory interface.

In an aspect combinable with the general implementation, the plurality of aural signals include natural language speaking from the two or more human speakers.

Another aspect combinable with any of the previous aspects further includes deriving, with the one or more machine learning engines, at least one of the solution constraints based on at least one of the solution sentiments.

In another aspect combinable with any of the previous aspects, deriving at least one of the solution constraints based on at least one of the solution sentiments includes identifying, with the one or more machine learning engines, a consensus among the two or more human speakers regarding the at least one solution sentiment; and assigning, with the one or more machine learning engines, the at least one solution sentiment to one of the solution constraints.

In another aspect combinable with any of the previous aspects, deriving at least one of the solution constraints based on at least one of the solution sentiments includes assigning a weight, with the one or more machine learning engines, to the at least one solution sentiment based on an agreement between less than all of the two or more speakers regarding the at least one solution sentiment; and assigning, with the one or more machine learning engines, the at least one solution sentiment to one of the solution constraints based on the assigned weight exceeding a threshold value.

In another aspect combinable with any of the previous aspects, the threshold value includes a majority of a number of the two or more speakers.

In another aspect combinable with any of the previous aspects, deriving at least one of the solution constraints based on at least one of the solution sentiments includes applying, with the one or more machine learning engines, the at least one solution sentiment to a data corpus of the one or more machine learning engines; and deriving the at least one solution constraint from the data corpus.

Another aspect combinable with any of the previous aspects further includes prior to applying the at least one solution sentiment to the data corpus, training the one or more machine learning engines with the data corpus.

In another aspect combinable with any of the previous aspects, the data corpus includes a human user data training set and a global data training set.

In another aspect combinable with any of the previous aspects, the at least one solution to the human-perceived problem is based on all of the plurality of solution constraints and at least one of the plurality of solution sentiments.

Another aspect combinable with any of the previous aspects further includes identifying a particular one of the human speakers associated with a particular aural signal; and assigning, with the one or more machine learning engines, a weight to a particular term derived from the particular aural signal based on the identification of the particular human speaker.

In another aspect combinable with any of the previous aspects, the weight is derived based on the identification of the particular human speaker within a hierarchy of the two or more human speakers.

Another aspect combinable with any of the previous aspects further includes identifying, with one or more machine learning engines, another plurality of aural signals provided by the two or more human speakers, at least some of the other plurality of aural signals associated with the human-perceived problem; parsing, with the one or more machine learning engines, the other plurality of aural signals to generate another plurality of terms, each of the other terms associated with the human-perceived problem; deriving, with the one or more machine learning engines, another plurality of solution sentiments and another plurality of solution constraints from the plurality of other terms; adjusting, with the one or more machine learning engines, the at least one solution to the human-perceived problem based on the derived other solution sentiments and other solution constraints; and presenting the adjusted solution to the two or more human speakers through at least one of the graphical interface or the auditory interface.

In another aspect combinable with any of the previous aspects, deriving, with the one or more machine learning engines, the plurality of solution sentiments includes deriving at least one of the solution sentiments by identifying, with the one or more machine learning engines, a set of the terms associated with a particular solution sentiment; and deriving the particular solution sentiment based on the set of terms.

In another aspect combinable with any of the previous aspects, deriving the particular solution sentiment based on the set of terms includes identifying, with the one or more machine learning engines, a particular human speaker associated with each of the terms in the set of terms; weighting, with the one or more machine learning engines, each of the terms based on the identified particular human speaker; and deriving the particular solution sentiment based on the weighted terms in the set of terms.

Another aspect combinable with any of the previous aspects further includes presenting one or more reasons for the at least one solution of the human-perceived problem to the two or more human speakers through at least one of the graphical interface or the auditory interface.

In another aspect combinable with any of the previous aspects, the one or more reasons include at least one of a description of at least one of the plurality of solution sentiments; or a description of at least one of the plurality of solution constraints.

Another aspect combinable with any of the previous aspects further includes graphically presenting the one or more reasons for the at least one solution of the human-perceived problem in a Venn diagram.

In another general implementation, a computing system includes one or more machine learning engines, each of the machine learning engines including one or more hardware processors; at least one auditory signal receiver communicably coupled to the one or more machine learning engines; and one or more memory devices communicably coupled with the one or more machine learning engines, each of the one or more memory devices including tangible, non-transitory, machine-readable media storing instructions, that when executed by the one or more hardware processors, perform operations including identifying a plurality of aural signals provided by two or more human speakers through the at least one auditory signal receiver, at least some of the plurality of aural signals associated with a human-perceived problem; parsing the plurality of aural signals to generate a plurality of terms, each of the terms associated with the human-perceived problem; deriving a plurality of solution sentiments and a plurality of solution constraints from the plurality of terms; generating at least one solution to the human-perceived problem based on the derived solution sentiments and solution constraints; and presenting the at least one solution of the human-perceived problem to the two or more human speakers through at least one of a graphical interface or an auditory interface.

In another general implementation, a non-transitory computer-readable medium storing software including instructions executable by one or more computers which, upon such execution, cause the one or more computers to perform operations including identifying a plurality of aural signals provided by two or more human speakers through the at least one auditory signal receiver, at least some of the plurality of aural signals associated with a human-perceived problem; parsing the plurality of aural signals to generate a plurality of terms, each of the terms associated with the human-perceived problem; deriving a plurality of solution sentiments and a plurality of solution constraints from the plurality of terms; generating at least one solution to the human-perceived problem based on the derived solution sentiments and solution constraints; and presenting the at least one solution of the human-perceived problem to the two or more human speakers through at least one of a graphical interface or an auditory interface.

Particular implementations of the subject matter described in this disclosure can be implemented so as to realize one or more of the following advantages. Implementations of the present disclosure may provide for real-time solutions to problems through aural inputs received from one or more persons in a conversation setting. Implementations of the present disclosure may provide for updating of such real-time solutions based on additional aural inputs that confirm or contradict previously considered aural inputs. Implementations of the present disclosure may provide for updating of such real-time solutions based on additional aural inputs that confirm or contradict previously considered aural inputs.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

This disclosure generally relates to methods, apparatus, and systems for generating solutions from aural inputs. In example implementations, a generative solution system includes one or more machine learning engines that receive aural or auditory signals. The aural or auditory signals have been parsed, or are parsed by the one or more machine learning engines, for terms associated with one or more solutions to a problem. The one or more machine learning engines may, in some aspects, separate such terms into different categories, such as, for example, sentiment terms, agreement (and/or disagreement) terms, and constraint terms. In some aspects, the one or more machine learning engines may assign weights to terms, either within categories of terms, across all terms (or a subset of terms that spans across categories of terms), or both. In some aspects, the one or more machine learning engines derive one or more solutions to the problem based on, for example, one or more of the terms, the categorization of such terms, the weighting of such terms, or even other aural inputs. Graphical representations of the solutions, as well as auditory representations of the solutions, may be presented to the conversationalists in real-time (e.g., during the conversation).

Implementations of the present disclosure may be discussed in further detail with reference to an example context. The example context includes a group of human-speakers that form a city council (or other governmental or administrative body) that are gathered to discuss a problem of what to do with an undeveloped parcel of land that is owned by the city (or other governmental jurisdiction).

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands—or even millions—of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 1:
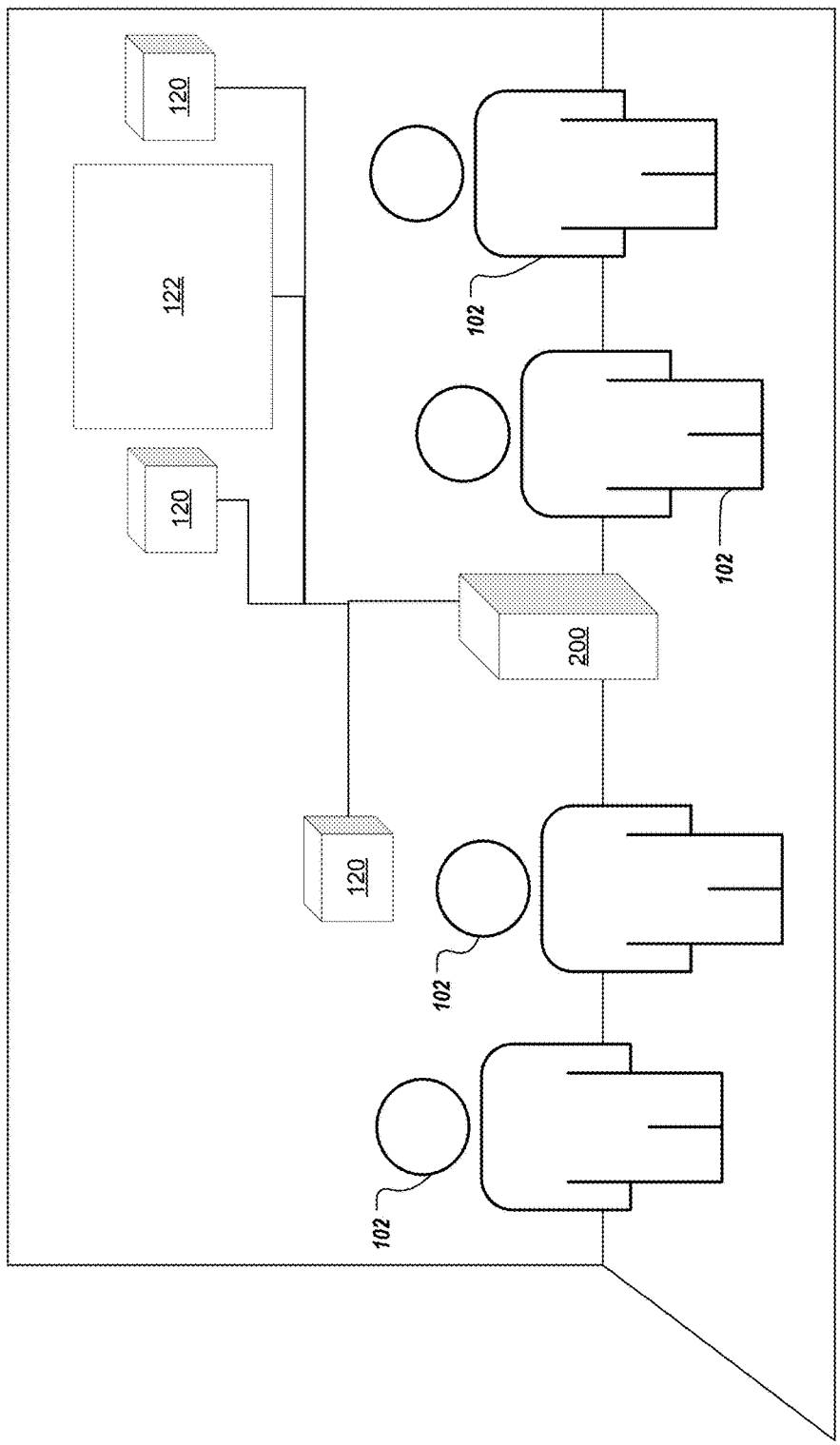
FIG. 1 depicts an example environment in which a system in accordance with implementations of the present disclosure may operate.

FIG. 1 depicts an example environment 100 in which a system in accordance with implementations of the present disclosure may operate. As illustrated, the environment 100 includes multiple human-speakers 102 within audible distance to one or more auditory sensors 120 that are communicably coupled to a solution generator system 200, which in turn is communicably coupled to a graphical user interface (GUI) 122. Generally, the auditory sensors 120 represent one or both of an auditory receiver (e.g., a microphone) that can receive aural signals (e.g., sounds such as natural conversation from the speakers 102) and an auditory transmitter (e.g., speaker) that can output auditory signals generated by the system 200 to the speakers 102. The GUI 122, in some aspects, may be an interactive or one-way visual device, such as, for example, a display, television, touch pad, monitor, or other device capable of transmitting visual images generated by the system 200 to the human speakers 102. The solution generator system 200, in some aspects, is a computing system having one or more hardware processors, one or more memory devices, as well as one or more input and output devices (not shown in FIG. 1). Generally, system 200 may execute operations according to the present disclosure to receive aural signals from a natural language conversation between human-speakers 102 and generate a solution to a human-perceived problem that is the subject of the natural language conversation.

While environment 100 is a single room, more generally, the system can be applied to other, e.g., more extensive, environments as the specific application context demands. For example, the environment may include multiple rooms encompassing, e.g., an entire home or place of work. The environment may also extend to speakers that are not co-located, such as speakers at different, separate locations that are communicating over audio or AV devices, such as teleconferences, speaker phones, videoconferencing and other communication systems. In some implementations, the environment encompasses public spaces, such as shopping malls and other retail spaces, schools and colleges, hospitals and other health care facilities, assisted living facilities, governmental or administrative spaces etc. Further although a particular number of human speakers 102, auditory sensors 120, system 200, and GUI 122 are illustrated in this example environment 100, the present disclosure contemplates that there may be any number of human speakers 102, auditory sensors 120, system 200, and GUI 122, including only one of any of the human speakers 102, auditory sensors 120, system 200, and GUI 122.

Figure 2:
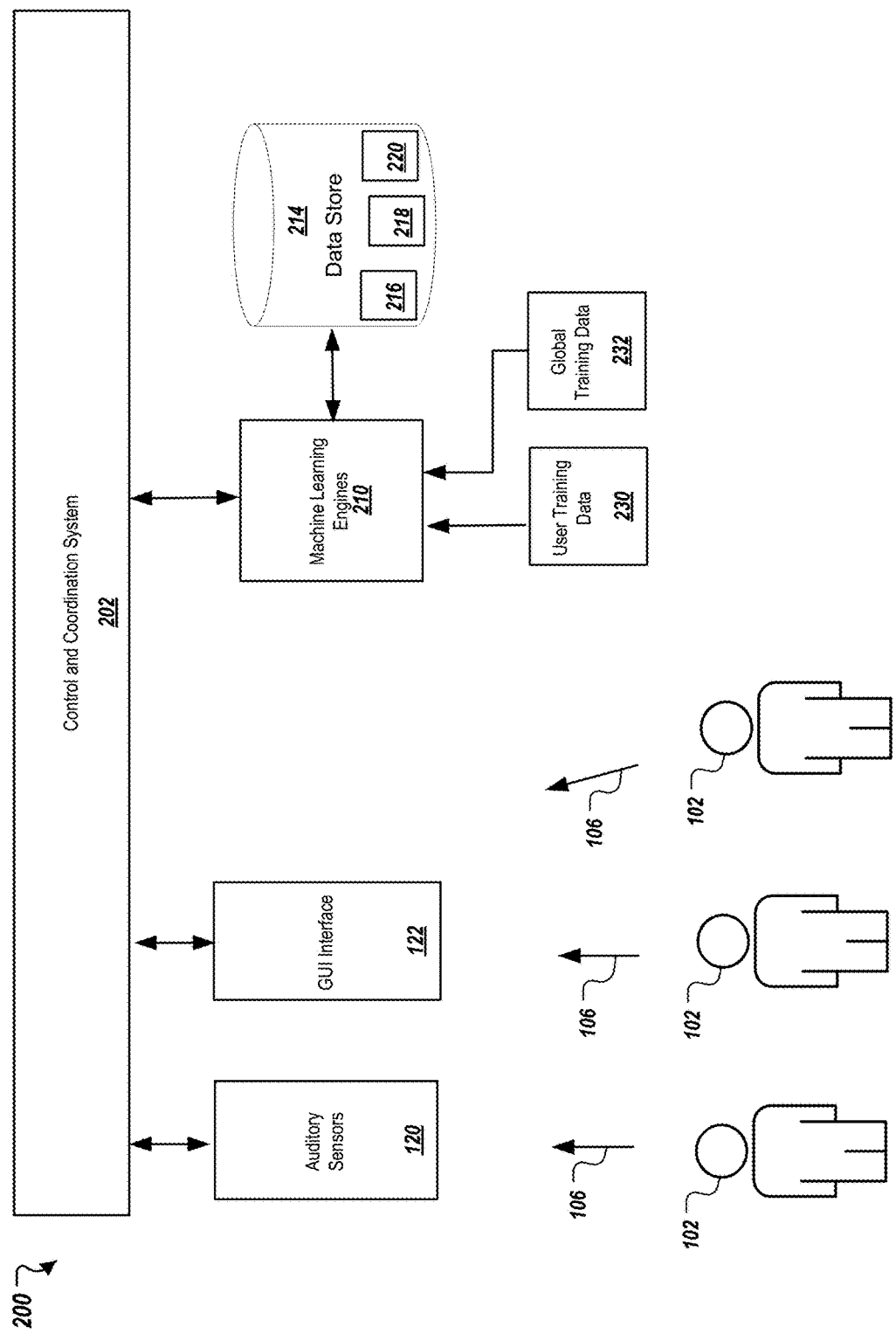
FIG. 2 is a block diagram of an example system in accordance with implementations of the present disclosure.

FIG. 2 depicts a block diagram of an example solution generator system 200 in accordance with implementations of the present disclosure. The system 200, generally, receives aural signals in the form of natural language conversation between or among the human speakers 102 focused on solving a human-perceived problem and generating one or more solutions to the problem. The system includes a control and coordination system (CCS) 202. The CCS 202 coordinates the data transfer between and control of multiple operation modules of the system 200. The CCS 202 can include, for example, a one or more computing devices such as servers, cloud servers, personal computers, mobile computing devices, smartphones, tablet computers, or a solution generator system specific computing device. For example, a solution generator system specific computing device can include processor(s) and data store(s) particularly configured for performing the operations disclosed herein. As shown, the CCS 202 is communicably coupled to, e.g., the auditory sensors 120, the GUI interface 122, and one or more machine learning engines 210.

The machine learning engines 210 can be provided as one or more computer executable software modules or hardware modules. For example, in some implementations, the machine learning engines 210 can be provided as one or more software modules. The software modules can be executed by the same computing device or distributed across multiple computing devices. In some implementations, the machine learning engines 210 can be provided as a hardware module in electronic communication with the CCS 202. In some alternative implementations, the CCS 202 and the machine learning engines 210 may be combined into one or more computer executable software modules or hardware modules.

Although not illustrated, the system 200, including the machine learning engines 210, may be communicably coupled to one or more networks. The one or more networks may be all or a portion of an enterprise or secured network, while in another instance at least a portion of the one or more networks may represent a connection to the Internet. In some instances, a portion of the networks may be a virtual private network (VPN), and can include one or more local area networks (LANs), radio access networks (RANs), metropolitan area networks (MANs), wide area networks (WANs), all or a portion of the Internet, and/or any other communication system or systems at one or more locations. In some aspects, one or more machine learning data training sets, such as user training data 230 and global training data 232, may be accessible to the machine learning engines 210 over the one or more networks, including all or a portion of the Internet.

In some implementations, the machine learning engines 210 include or generate a machine learning model that has been trained to receive model inputs and to generate a predicted output for each received model input to execute one or more processes described in the present disclosure. In some implementations, the machine learning model is a deep model that employs multiple layers of models to generate an output for a received input. For example, the machine learning model may be a deep neural network. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a shallow machine learning model, e.g., a linear regression model or a generalized linear model.

For example, model inputs may include aural signals 106, or (as described later) model terms 216 that may be generated from the aural signals 106, or both. Model inputs may also include, for example, solution constraints 218, solutions sentiments 220, or both (as described later). As shown, terms 216, solution constraints 218, and solution sentiments 220 may be stored in a data store 214 (e.g., database or other memory device, implemented as software, hardware, firmware, or a combination thereof).

In some implementations, the machine learning engines 210 can incorporate training data 230 that is specific to a particular human-speaker 102 or a number of human-speakers 102, or a similar human-speaker as the human-speakers 102 present within the environment 100. In some implementations, the machine learning engines 210 can obtain user specific training data 230 during a training period (e.g., a training mode of the solution generator system 200). For example, the system 200 can acquire training data and train a machine learning model of the machine learning engines 210 by, for example, receiving the aural signals 106 from specific human-speakers 102 and confirming (e.g., through feedback from the human-speakers 102) that the received aural signals 106 have been accurately interpreted, e.g., to account for natural language variation among speakers.

In some implementations, the machine learning engines 210 can incorporate global training data 232 (e.g., data sets) from a population of users or sources, such as sources accessible through the network. In some implementations, global training data 232 can be related to particular human-perceived problems (e.g., commonly addressed problems). For example, different global training data sets 232 can be obtained that are related to events or actions that commonly raise problems and require solutions, or groups of human-speakers that commonly attempt to solve human-perceived problems through natural language conversation. In some aspects, global training data 232 can be related to particular environments (e.g., indoor/outdoor, formal/informal settings). In some aspects, global training data 232 can be crowd sourced.

Figure 3:
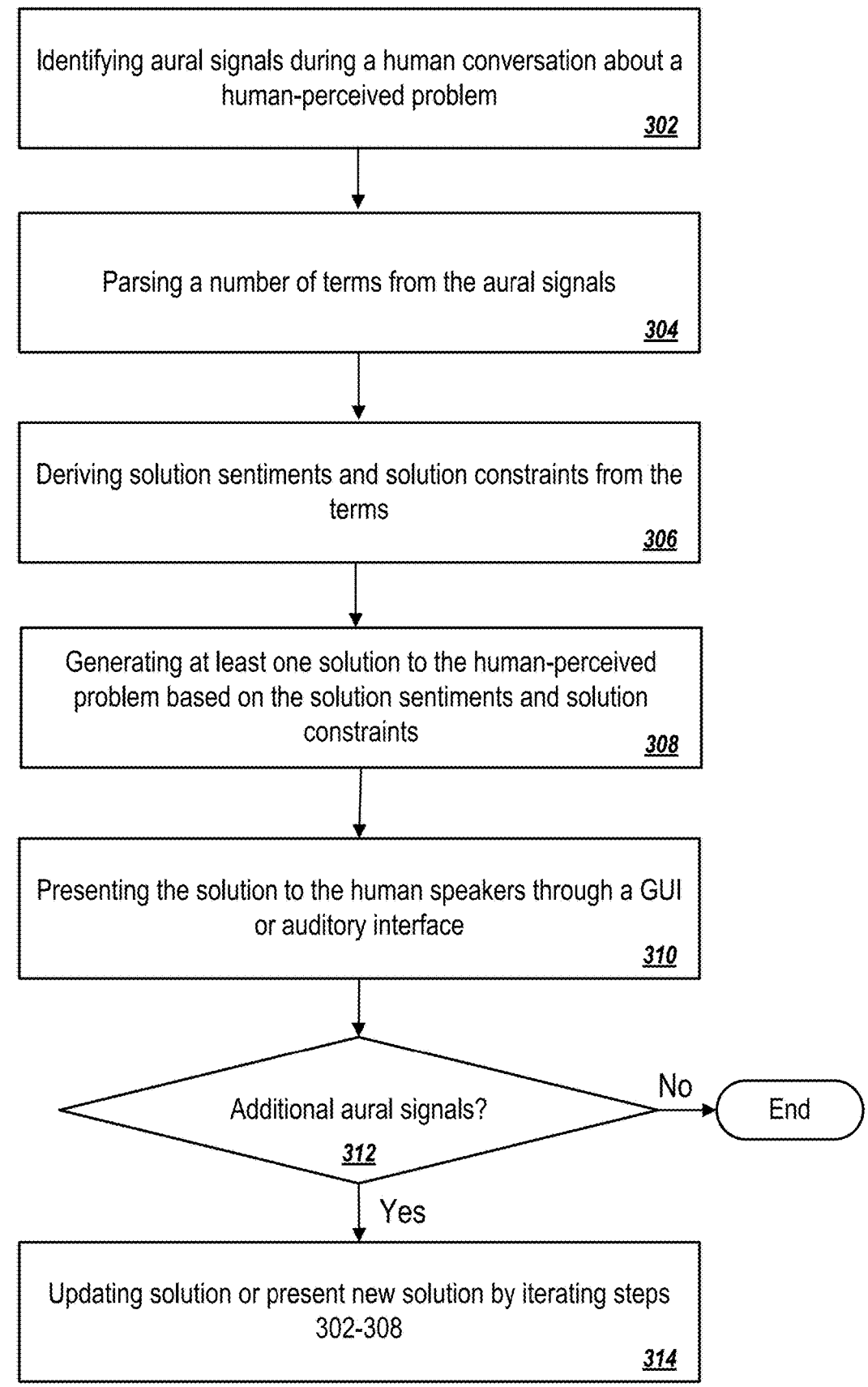
FIG. 3 is a flowchart of an example process for generating a solution based on aural inputs.

FIG. 3 depicts a flowchart of an example process 300 for generating a solution to a human-perceived problem that can be executed in accordance with implementations of the present disclosure. In some implementations, the process 300 can be provided as one or more computer-executable programs executed using one or more computing devices. In some examples, the process 300 is executed by a solution generating system such as system 200 of FIG. 2.

In some aspects, process 300 may begin at step 302, which includes identifying aural signals during a human conversation about a human-perceived problem. For example, a solution generating system, such as system 200, may be arranged in a location in which a human conversation between two or more human speakers occurs, such as the environment 100 shown in FIG. 1. The human speakers may converse (e.g., in natural language conversation) about a particular problem in which they perceive a solution (or solutions) is necessary. As the contextual example introduced above, a city council, or other governmental or agency body, may meet to determine how a parcel of land that is owned by the city (or other political jurisdiction) should be utilized. The city council members, during an ensuing conversation regarding this issue, or problem, generate aural signals (e.g., natural language speech) that can be received at, for example, one or more auditory receivers (e.g., microphones) of the system 200. The aural signals may then be transmitted to, and in some cases stored at, a machine learning engine (or engines) of the system 100 that includes a data store (e.g., as shown in FIG. 2). The machine learning engine can transform the aural signals into digital representations of the signals, e.g., digital representations of the words that are part of the natural language speech of the conversation.

Process 300 may continue at step 304, which includes parsing a number of terms from the aural signals. For example, in some aspects, the system 200, including the machine learning engine(s) may determine key, or otherwise descriptive terms, from all of the digital representations of the aural signals received during the human conversation. In some aspects, the machine learning engine(s) may select and parse terms from the digital representations based on a previously trained machine learning model. For example, terms such as "park," "pool," "community," "sports," "trees" and so forth may be recognized by the machine learning engines as related to, or associated with, the issue of how to use a parcel of land. Other terms, such as prepositions, or terms that the machine learning engines determine to be unrelated or irrelevant to the perceived problem to be solved, may be discarded, saved for later use, or ignored. As the human conversation continues, additional terms may be parsed and stored (even if transiently) by the system 200.

Process 300 may continue at step 306, which includes deriving solution sentiments and solution constraints from the terms. For example, in some aspects, the machine learning engines may differentiate terms into categories such as solution sentiments (e.g., desirable or preferable criteria or conditions of the solution to the human-perceived problem, qualitative or unquantifiable criteria or conditions of the solution to the human-perceived problem) and solution constraints (e.g., requirements of the solution to the human-perceived problem, quantifiable criteria or conditions of the solution to the human-perceived problem, consensus among the human speakers for a particular criteria or condition of the solution to the human-perceived problem). For example, in some aspects, a solution sentiment may be further categorized into one or more categories. For instance, a solution sentiment may include a viewpoint held by one or more human speakers (and expressed through the aural signals) that does not rise to a level of consensus or agreement among all (or a majority) of the human speakers. As another example, a solution sentiment may be a term that describes or is associated with a wish, desire, or preference of a particular criteria to be included in the solution to the human-perceived problem. As yet another example, a solution sentiment may include an unquantifiable criteria or condition of the solution, such as a term of degree (e.g., an expressed desire of a "large" pool on the parcel of land).

In contrast, a solution constraint may include a particular requirement that the solution to the human-perceived problem must include. A solution constraint may be derived in many different ways. For example, a solution constraint may be derived based on a consensus or full agreement among the human speakers as captured through the aural signals. For instance, if the captured aural signals, and generated terms, indicate that each human speaker, or a majority of the human speakers, or a consensus among the human speakers, expressed a preference for a pool to be built on the parcel of land, then the "pool" becomes a solution constraint. In some aspects, every derived solution would include each solution constraint.

In some aspects, a solution constraint can be derived based on weighted terms. For example, the machine learning engines may assign a weight to each generated term based on one or more criteria. For example, common terms generated from aural signals from multiple human speakers may be given a higher weight than a term generated from aural signals of a single (or less than a majority or a consensus number) human speaker. As another example, the machine learning engines may assign a weight to one or more terms generated from aural signals of a particular human speaker, e.g., based on seniority, position, experience, or other criteria. For instance, terms generated from aural signals from a head of the city council may be weighted more heavily than terms generated from aural signals from a non-voting member of the city council. In some aspects, the machine learning engines may be trained (e.g., with a data set associated with the particular human speakers) prior to implementation of the process 300 to include such knowledge and data of the human speakers.

In some aspects, solution sentiments can be weighted as described to derive solution constraints. For example, solution sentiments may be weighted according to a number of human speakers that express (e.g., through the aural signals) an identical or a similar sentiment. If the weight (or number of human speakers) reaches a threshold value (e.g., majority of speakers or other threshold), a solution sentiment may become a solution constraint.

As another example, a solution constraint may be derived from a solution sentiment to which a data corpus has been applied by the machine learning engines. For instance, the machine learning engines may determine, based on the application of the solution sentiment to the data corpus that the particular solution sentiment should be a solution constraint, and as such, a new solution constraint is derived from the solution sentiment. As an example, aural signals transformed into terms may indicate that having a "restroom" on the parcel of public land is a desired solution sentiment. The machine learning engines, in applying the term "restroom" to a data corpus that includes data about public land facilities may determine, for example, that all or a vast majority of public land facilities include restrooms, or that legal code or statute requires that all public land facilities require at least one restroom. Based on such a determination, the solution sentiment of a "restroom" may become a solution constraint.

Process 300 may continue at step 308, which includes generating at least one solution to the human-perceived problem based on the solution sentiments and solution constraints. For example, the machine learning engines may determine all of the solution constraints derived in step 306 and generate at least one solution to the human-perceived problem that includes the solution constraints. In some aspects, the machine learning engines may determine one or more solution sentiments (e.g., based on weighting as previously described above or otherwise) is to be included in the solution to the human-perceived problem. Continuing the practical example of the public parcel of land, the determined solution constraints may include that the parcel have a public restroom, include a pool (e.g., a constraint derived from a sentiment based on consensus), and a playground (e.g., a constraint derived from a sentiment that, when applied to a data corpus of public parks, become a constraint). Further, the parcel may include a number and type of added trees based on solution sentiment expressed by a consensus of the human speakers.

Process 300 may continue at step 310, which includes presenting the solution to the human speakers through a GUI or auditory interface. For example, the solution generated in step 308 may be graphically displayed to the human speakers, in the practical example, as a rendering or drawing of the proposed solution for the parcel of land (e.g., with a restroom building, pool, etc.) As another example, the solution may be expressed to the human speakers as a list of the constraints and sentiments that are included in the solution (e.g., graphically or through auditory output).

In some aspects, a presented solution may include reasons or evidence that support the inclusion or one or more solution constraints or solution sentiments that are part of the presented solution. For example, the machine learning engines, in generating particular constraints, may also include in the solution one more basis for the constraints (e.g., agreement or consensus on this constraint, legal code required a particular sentiment to become a constraint). Such reasons or evidence in support of the generated solution(s) may be presented alongside the solution(s) (e.g., graphically or otherwise).

Process 300 may continue at step 312, which includes a determination of whether there are additional aural signals. For example, as human conversation among the human speakers continues, more aural signals (e.g., through natural language conversation) may be received at system 200. In some aspects, the human speakers may orally indicate that the proposed solution (or solutions) from step 310 are sufficient, thereby ending the process. However, in some aspects, absent an express or affirmative end to the process by one or more of the human speakers, additional aural signals may be continuously or periodically received. As such, process 300 may continue to step 314.

Process 300 may continue at step 314, which includes updating the solution(s) or presenting a new solution by iterating steps 302-308. For example, as additional aural signals are received, steps 302 and 308 may be repeated (as many times as desired or necessary) to arrive at an acceptable solution (or arrive at an otherwise stopping point for the process as indicated by the human speakers). Thus, additional terms may be parsed to derive additional solution sentiments and solution constraints. Some solution sentiments and solution constraints may be new as compared to previously derived (e.g., the addition of a "parking lot" to the solution, which had not been previously mentioned by one or more human speakers). Some solution sentiments and solution constraints may adjust or modify previously derived solution sentiments and solution constraints (e.g., the previous constraint of a "pool" should include a new sentiment of a "diving board"). As iterative solutions are generated (in iterative steps 308) they may be presented to the human speakers graphically or otherwise.

Figure 4:
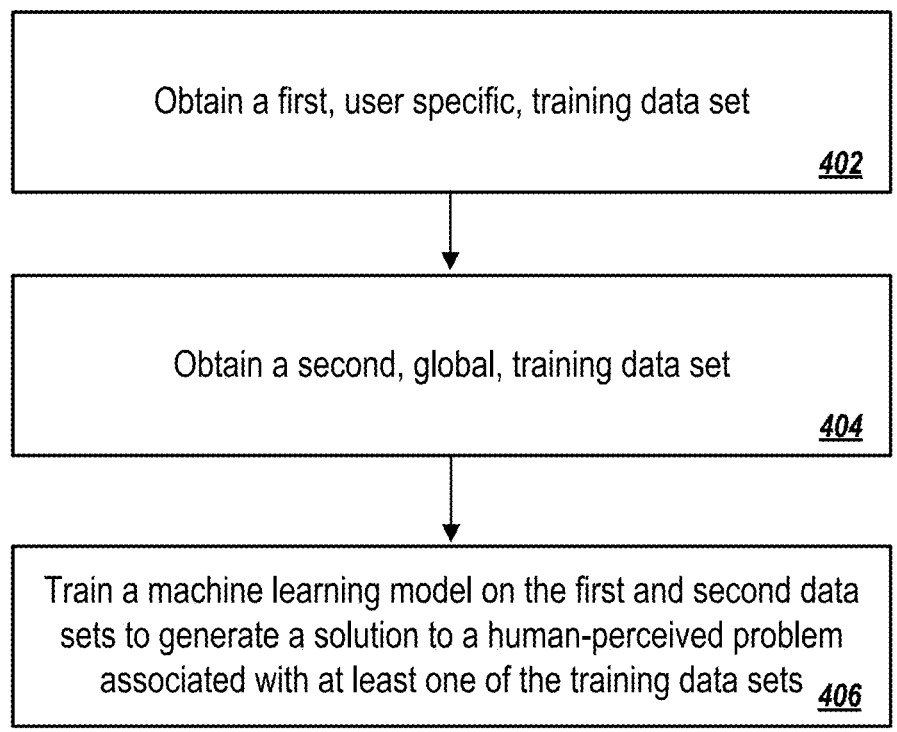
FIG. 4 is a flowchart of an example process for training a machine learning model to generate a solution based on aural inputs.

FIG. 4 depicts a flowchart of an example process 400 for training a machine learning model to generate a solution to a human-perceived problem that can be executed in accordance with implementations of the present disclosure. In some implementations, the process 400 can be provided as one or more computer-executable programs executed using one or more computing devices. In some examples, the process 400 is executed by a solution generating system, such as system 200 of FIG. 2.

The system obtains a first, user specific, training data set (402). The first training data set can include data related to the human speakers (102) that are to discuss (or discussing) the human-perceived problem. In some cases, such data can be input (e.g., by the speakers themselves, for privacy reasons) or obtained through public sources by the system 200. Data can include public information, such as position, rank, experience, employer, that may be relevant to the discussion of the human-perceived problem (e.g., for weighting criteria). Data can also include personal information (e.g., entered under privacy and security protections) such as residence, work history, or otherwise.

The system obtains a second, global, training data set (404). The second training data set can include data related to the human-perceived problem to be solved. For example, prior to discussion of such a problem, the system 200 may be informed of the problem to be solved (e.g., in the practical example, "what are the uses for a public parcel of land"). The system 200 may be trained, therefore, on a data corpus that is relevant for the particular human-perceived problem. In some aspects, the multiple different sets of global training data can be used to train the machine learning model.

The system trains a machine learning model on the first and second data sets help generate solutions to the human-perceived problem (406). The machine learning model can be trained on data related to the particular human-speakers, data related to persons (or positions) that, while not the particular human-speakers present to discuss the human-perceived problem, are in similar positions (or experience, or rank) as those human-speakers present to discuss the human-perceived problem. In some aspects, the system obtains the first, user specific, training data set during a training period (e.g., a training mode of a solution generator system). In some implementations, the training data includes corrective user feedback. For example, during a training mode, the system may receive corrective commands from a user when the system identifies incorrect user data. In some aspects, the machine learning model can be previously validated for a general population of human-perceived problems, such as for a specific body of human-speakers that routinely or often gather to discuss similar or related human-perceived problems. For example, the machine learning model can be initialized with a default initialization that has been tested and validated by a general population of human-speakers of a particular position or type (e.g., city councils, boards of directors, coaching staffs, military officers). For example, such an initialization process may ensure that the machine learning model has a minimum level of functionality before being delivered to a user.

As used herein, the term "real-time" refers to transmitting or processing data without intentional delay given the processing limitations of a system, the time required to accurately obtain data and images, and the rate of change of the data and images. In some examples, "real-time" is used to describe the updating of a previously presented solution to a human-perceived problem, or presentation of a new solution to the human-perceived problem by the system 200.

Figure 5:
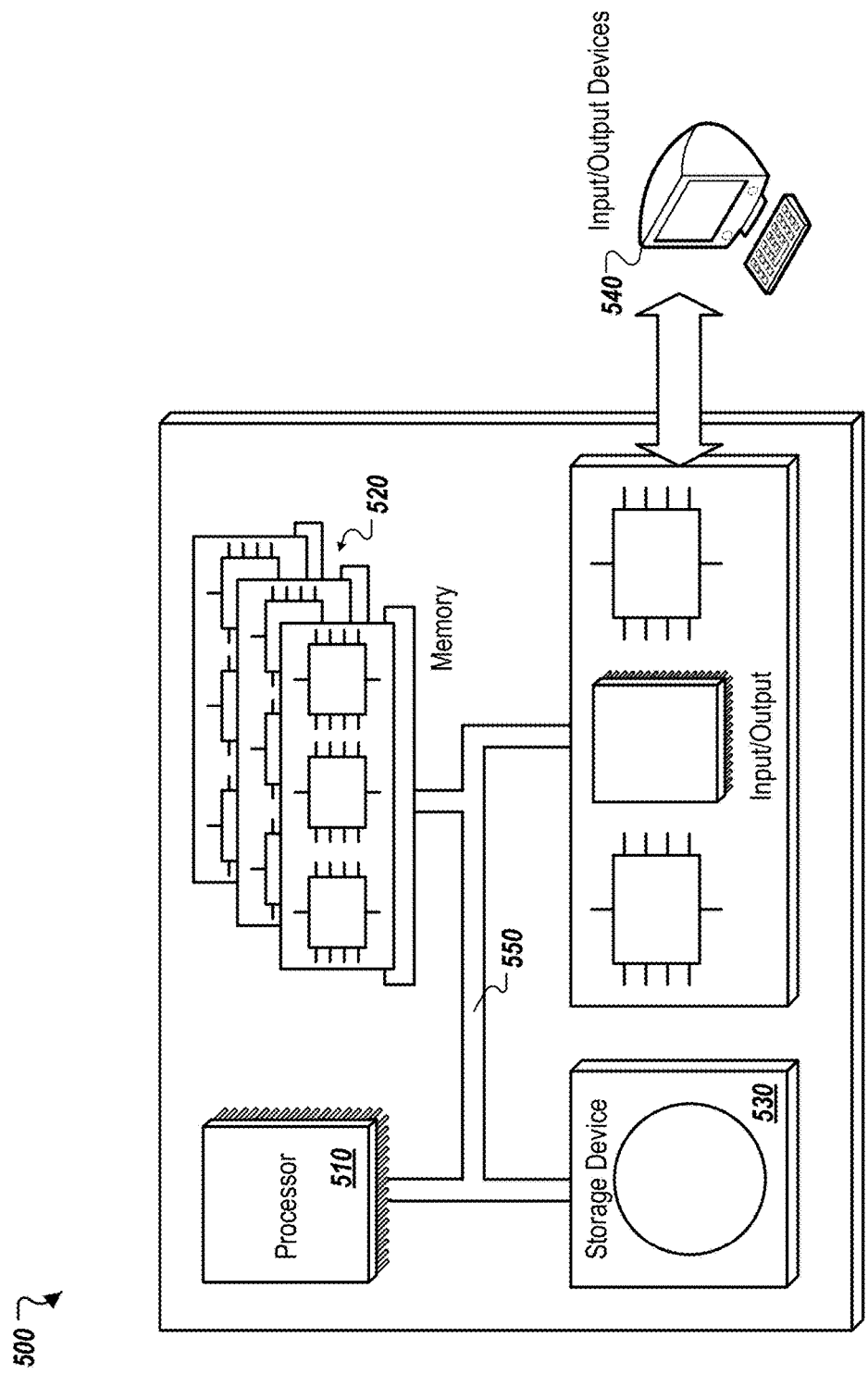
FIG. 5 is a schematic diagram of an example computer system 500.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 400. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving one or more utterances that were spoken during a conversation between human participants regarding a particular human-perceived problem;
providing a representation of the one or more utterances that were spoken during the conversation between the human participants regarding the particular human-perceived problem, as input to a model that is trained to determine solution constraints or solution sentiments for solving human-perceived problems from input representations of utterances, and to generate and output solutions to the human-perceived problems based on the solution constraints or solution sentiments that are determined from the input representations of utterances;
receiving, from the model, a particular solution to the particular human-perceived problem that was discussed in the conversation between the human participants, in response to providing the representation of the one or more utterances as input to the model; and
providing a representation of the particular solution for output to one or more of the human participants on the conversation.

2. The method of claim 1, wherein the representation of the one or more utterances comprises a textual transcription of the one or more utterances.

3. The method of claim 1, wherein the representation of the one or more utterances comprises terms that are parsed from the one or more utterances.

4. The method of claim 1, wherein the representation of the particular solution is output to the human participants of the conversation in real time to receiving the one or more utterances.

5. The method of claim 1, wherein the model generates the solutions using generative design processes.

6. The method of claim 1, wherein the utterances are received during the conversation between the human participants who are speaking to each other via videoconferences.

7. The method of claim 1, wherein a solution constraint is a solution sentiment that is determined to be shared by more than a threshold quantity of the users.

8. A non-transitory computer-readable medium storing software comprising instructions executable by one or more computers which, upon such execution, cause the one or more computers to perform operations comprising:
    receiving one or more utterances that were spoken during a conversation between human participants regarding a particular human-perceived problem;
    providing a representation of the one or more utterances that were spoken during the conversation between the human participants regarding the particular human-perceived problem, as input to a model that is trained to determine solution constraints or solution sentiments for solving human-perceived problems from input representations of utterances, and to generate and output solutions to the human-perceived problems based on the solution constraints or solution sentiments that are determined from the input representations of utterances;
    receiving, from the model, a particular solution to the particular human-perceived problem that was discussed in the conversation between the human participants, in response to providing the representation of the one or more utterances as input to the model; and
    providing a representation of the particular solution for output to one or more of the human participants on the conversation.

9. The medium of claim 8, wherein the representation of the one or more utterances comprises a textual transcription of the one or more utterances.

10. The medium of claim 8, wherein the representation of the one or more utterances comprises terms that are parsed from the one or more utterances.

11. The medium of claim 8, wherein the representation of the particular solution is output to the human participants of the conversation in real time to receiving the one or more utterances.

12. The medium of claim 8, wherein the model generates the solutions using generative design processes.

13. The medium of claim 8, wherein the utterances are received during the conversation between the human participants who are speaking to each other via videoconferences.

14. The medium of claim 8, wherein a solution constraint is a solution sentiment that is determined to be shared by more than a threshold quantity of the users.

15. A system comprising:
    one or more processing devices; and
    one or more storage devices storing instructions that are executable by the one or more processing devices to perform operations comprising:
    receiving one or more utterances that were spoken during a conversation between human participants regarding a particular human-perceived problem;
    providing a representation of the one or more utterances that were spoken during the conversation between the human participants regarding the particular human-perceived problem, as input to a model that is trained to determine solution constraints or solution sentiments for solving human-perceived problems from input representations of utterances, and to generate and output solutions to the human-perceived problems based on the solution constraints or solution sentiments that are determined from the input representations of utterances;
    receiving, from the model, a particular solution to the particular human-perceived problem that was discussed in the conversation between the human participants, in response to providing the representation of the one or more utterances as input to the model; and
    providing a representation of the particular solution for output to one or more of the human participants on the conversation.

16. The system of claim 15, wherein the representation of the one or more utterances comprises a textual transcription of the one or more utterances.

17. The system of claim 15, wherein the representation of the one or more utterances comprises terms that are parsed from the one or more utterances.

18. The system of claim 15, wherein the representation of the particular solution is output to the human participants of the conversation in real time to receiving the one or more utterances.

19. The system of claim 15, wherein the model generates the solutions using generative design processes.

20. The system of claim 15, wherein the utterances are received during the conversation between the human participants who are speaking to each other via videoconferences.

* * * * *